US012487265B2

(12) United States Patent
Koga et al.

(10) Patent No.: US 12,487,265 B2
(45) Date of Patent: Dec. 2, 2025

(54) HARNESS WITH RODENT CONTROL

(71) Applicant: Oshkosh Corporation, Oshkosh, WI (US)

(72) Inventors: Jeffrey Koga, Oshkosh, WI (US);
Emily Davis, Rochester, MN (US);
Clinton T. Weckwerth, Pine Island, MN (US); Vincent Hoover, Byron, MN (US); Zachary L. Klein, Rochester, MN (US); Jerrod Kappers, Oshkosh, WI (US); Derek A. Wente, Austin, MN (US); Logan Gary, Oshkosh, WI (US);
Joshua D. Rocholl, Rochester, MN (US); Chad K. Smith, Omro, WI (US)

(73) Assignee: Oshkosh Corporation, Oshkosh, WI (US)

( * ) Notice: Subject to any disclaimer, the term of this patent is extended or adjusted under 35 U.S.C. 154(b) by 459 days.

(21) Appl. No.: 17/483,946

(22) Filed: Sep. 24, 2021

(65) Prior Publication Data

US 2022/0099723 A1 Mar. 31, 2022

Related U.S. Application Data

(60) Provisional application No. 63/084,141, filed on Sep. 28, 2020.

(51) Int. Cl.
*G01R 31/00* (2006.01)
*B60R 16/02* (2006.01)
(Continued)

(52) U.S. Cl.
CPC ........ *G01R 31/006* (2013.01); *B60R 16/0215* (2013.01); *G08B 5/22* (2013.01); *H01B 7/0045* (2013.01); *H01B 7/18* (2013.01)

(58) Field of Classification Search
CPC .. B60R 16/0215; G01R 31/006; G01R 31/54;
G08B 5/22; H01B 5/02; H01B 7/0045;
(Continued)

(56) References Cited

U.S. PATENT DOCUMENTS

| 3,100,203 A | 8/1963 | Borchert |
| 3,877,315 A | 4/1975 | Carrigan |

(Continued)

FOREIGN PATENT DOCUMENTS

| CN | 104217815 A | * | 12/2014 | ............. H01B 13/02 |
| KR | 20100103186 A | * | 9/2010 | ............ G01R 31/041 |

OTHER PUBLICATIONS

English Translation of KR 2010-0103186 to Won (Year: 2010).*

*Primary Examiner* — Judy Nguyen
*Assistant Examiner* — Brent J Andrews
(74) *Attorney, Agent, or Firm* — Foley & Lardner LLP

(57) ABSTRACT

A fault detection system for a vehicle is shown. The system includes an electrical control unit configured to control one or more electrical systems on the vehicle, a power source, and a wire harness. The wire harness includes a plurality of wires, the plurality of wires including (i) a first wire electrically coupled to the electrical control unit and one or more sensors and (ii) a second wire electrically coupled to the power source and at least one of the one or more electrical systems. The second wire is enclosed within a protective covering. The electrical control unit is configured to monitor a resistance or conductance of the second wire via the one or more sensors and detect a wire conductivity fault in the second wire.

20 Claims, 10 Drawing Sheets

(51) Int. Cl.
G08B 5/22 (2006.01)
H01B 7/00 (2006.01)
H01B 7/18 (2006.01)

(58) Field of Classification Search
CPC ... H01B 7/18; H01B 1/00; H01B 3/00; H01B 5/00; H01B 7/00; H01B 9/00; H01B 11/00; H01B 12/00; H01B 13/00; H01B 15/00; H01B 17/00; H01B 19/00
See application file for complete search history.

(56) References Cited

U.S. PATENT DOCUMENTS

| | | | |
|---|---|---|---|
| 4,897,044 A * | 1/1990 | Rood | H01R 11/24 320/105 |
| 5,171,121 A | 12/1992 | Smith et al. | |
| 5,378,010 A | 1/1995 | Marino et al. | |
| 9,981,803 B2 | 5/2018 | Davis et al. | |
| D869,332 S | 12/2019 | Gander et al. | |
| D899,452 S | 10/2020 | Klimes et al. | |
| 10,800,605 B2 | 10/2020 | Rocholl et al. | |
| 10,843,379 B2 | 11/2020 | Rocholl et al. | |
| 10,858,231 B2 | 12/2020 | Holmes et al. | |
| 10,859,167 B2 | 12/2020 | Jax et al. | |
| D910,670 S | 2/2021 | Klimes et al. | |
| 10,997,802 B2 | 5/2021 | Koga et al. | |
| 11,001,135 B2 | 5/2021 | Yakes et al. | |
| 11,001,440 B2 | 5/2021 | Rocholl et al. | |
| 11,007,863 B2 | 5/2021 | Yakes et al. | |
| 11,021,078 B2 | 6/2021 | Rocholl et al. | |
| 11,046,329 B2 | 6/2021 | Clifton et al. | |
| 11,059,436 B2 | 7/2021 | Wildgrube et al. | |
| 11,097,617 B2 | 8/2021 | Rocholl et al. | |
| 11,110,977 B2 | 9/2021 | Smith et al. | |
| 11,136,187 B1 | 10/2021 | Koga et al. | |
| 11,137,002 B2 | 10/2021 | Clifton et al. | |
| 11,148,550 B2 | 10/2021 | Rocholl et al. | |
| 11,148,880 B1 | 10/2021 | Koga et al. | |
| 11,161,415 B1 | 11/2021 | Koga et al. | |
| 11,167,919 B1 | 11/2021 | Koga et al. | |
| 11,254,498 B1 | 2/2022 | Koga et al. | |
| 11,254,499 B2 | 2/2022 | Rocholl et al. | |
| 11,254,500 B2 | 2/2022 | Buege et al. | |
| 2002/0071336 A1 | 6/2002 | Smith et al. | |
| 2006/0017445 A1 * | 1/2006 | Flock | G01R 31/55 324/503 |
| 2009/0140748 A1 * | 6/2009 | Lindsey | G01R 31/50 324/538 |
| 2015/0114711 A1 * | 4/2015 | Dew | H01B 7/0045 174/72 A |
| 2018/0265289 A1 | 9/2018 | Davis et al. | |
| 2019/0039407 A1 | 2/2019 | Smith | |
| 2019/0322321 A1 | 10/2019 | Schwartz et al. | |
| 2020/0262366 A1 | 8/2020 | Wildgrube et al. | |
| 2020/0265656 A1 | 8/2020 | Koga et al. | |
| 2020/0316816 A1 | 10/2020 | Messina et al. | |
| 2020/0317083 A1 | 10/2020 | Messina et al. | |
| 2020/0346547 A1 | 11/2020 | Rocholl et al. | |
| 2020/0346556 A1 | 11/2020 | Rocholl et al. | |
| 2020/0346557 A1 | 11/2020 | Rocholl et al. | |
| 2020/0346657 A1 | 11/2020 | Clifton et al. | |
| 2020/0346854 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346858 A1 | 11/2020 | Buege et al. | |
| 2020/0346859 A1 | 11/2020 | Buege et al. | |
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0347857 A1 | 11/2020 | Clifton et al. | |
| 2020/0348681 A1 | 11/2020 | Clifton et al. | |
| 2020/0348764 A1 | 11/2020 | Clifton et al. | |
| 2020/0399058 A1 | 12/2020 | Rocholl et al. | |
| 2021/0031649 A1 | 2/2021 | Messina et al. | |
| 2021/0054942 A1 | 2/2021 | Jax et al. | |
| 2021/0069934 A1 | 3/2021 | Rocholl et al. | |
| 2021/0070595 A1 | 3/2021 | Holmes et al. | |
| 2021/0139303 A1 | 5/2021 | Rosencrance et al. | |
| 2021/0221216 A1 | 7/2021 | Yakes et al. | |
| 2021/0225095 A1 | 7/2021 | Koga et al. | |
| 2021/0229755 A1 | 7/2021 | Schwartz et al. | |
| 2021/0229908 A1 | 7/2021 | Rocholl et al. | |
| 2021/0252995 A1 | 8/2021 | Rocholl et al. | |
| 2021/0316740 A1 | 10/2021 | Clifton et al. | |
| 2021/0316741 A1 | 10/2021 | Clifton et al. | |
| 2021/0323436 A1 | 10/2021 | Rocholl et al. | |
| 2021/0323437 A1 | 10/2021 | Rocholl et al. | |
| 2021/0323438 A1 | 10/2021 | Rocholl et al. | |
| 2021/0323763 A1 | 10/2021 | Koga et al. | |
| 2021/0323764 A1 | 10/2021 | Koga et al. | |
| 2021/0324880 A1 | 10/2021 | Wente et al. | |
| 2021/0325529 A1 | 10/2021 | Koga et al. | |
| 2021/0325911 A1 | 10/2021 | Koga et al. | |
| 2021/0326550 A1 | 10/2021 | Kappers et al. | |
| 2021/0327164 A1 | 10/2021 | Koga et al. | |
| 2021/0327170 A1 | 10/2021 | Rocholl et al. | |
| 2021/0327237 A1 | 10/2021 | Rocholl et al. | |
| 2021/0331635 A1 | 10/2021 | Wildgrube et al. | |
| 2021/0331636 A1 | 10/2021 | Wildgrube et al. | |
| 2021/0331637 A1 | 10/2021 | Wildgrube et al. | |
| 2021/0339632 A1 | 11/2021 | Rocholl et al. | |
| 2021/0339648 A1 | 11/2021 | Koga et al. | |
| 2021/0339949 A1 | 11/2021 | Rocholl et al. | |
| 2021/0345062 A1 | 11/2021 | Koga et al. | |
| 2021/0373560 A1 | 12/2021 | Koga et al. | |
| 2021/0380179 A1 | 12/2021 | Smith et al. | |
| 2021/0396251 A1 | 12/2021 | Clifton et al. | |
| 2021/0407222 A1 | 12/2021 | Koga et al. | |
| 2022/0009338 A1 | 1/2022 | Yakes et al. | |
| 2022/0033181 A1 | 2/2022 | Koga et al. | |

* cited by examiner

HARNESS WITH RODENT CONTROL

CROSS-REFERENCE TO RELATED APPLICATION

This application claims the benefit of and priority to U.S. Provisional Application No. 63/084,141, filed Sep. 28, 2020, the entire disclosure of which is incorporated by reference herein in its entirety.

BACKGROUND

Vehicles (e.g., refuse vehicles, concrete mixers, garbage trucks, etc.) can include a wide variety of electrical wires, wire busses, and/or wire harnesses for providing electrical connections throughout the vehicle. These electrical wires, wire busses, and/or wire harnesses can be exposed to the rodents, excess cementitious material, and other external factors that can degrade their operational ability and/or conductance.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a fault detection system for a vehicle. The system includes an electrical control unit configured to control one or more electrical systems on the vehicle, a power source, and a wire harness including a plurality of wires, the plurality of wires including (i) a first wire electrically coupled to the electrical control unit and one or more sensors and (ii) a second wire electrically coupled to the power source and at least one of the one or more electrical systems, the second wire is enclosed within a protective covering. In some embodiments, the electrical control unit is configured to, obtain a resistance or conductance of the second wire via the one or more sensors and detect a wire conductivity fault in the second wire.

Another implementation of the present disclosure is a fault detection system for a vehicle. The system includes an electrical control unit configured to control one or more electrical systems on the vehicle, a power source, and a wire harness including a plurality of insulation layers and a plurality of wires, the plurality of wires including (i) a first wire electrically coupled to the electrical control unit and one or more sensors and (ii) a second wire electrically coupled to the power source and at least one of the one or more electrical systems, the second wire is enclosed within a protective covering. In some embodiments, the electrical control unit is configured to obtain a resistance or conductance for each of a plurality of insulation layers, obtain a resistance or conductance of the second wire via the one or more sensors; and detect a wire conductivity fault in each of the plurality of insulation layers and the second wire.

Another implementation of the present disclosure is a controller including a processing circuit configured to monitor connectivity of a wire harness comprising a plurality of wires, the plurality of wires including (i) a first wire electrically coupled to the electrical control unit and one or more sensors and (ii) a second wire electrically coupled to the power source and at least one of the one or more electrical systems, the second wire is enclosed within a protective covering, obtain a resistance or conductance of the second wire via the one or more sensors, detect a wire conductivity fault in the second wire, and provide a notification to an operator of the vehicle indicating the wire conductivity fault.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, systems and methods for detecting faults within one or more wires inside of a wire harness based on the conductivity of one or more wires within the harness are shown, according to exemplary embodiments. In one embodiment, the components and functionality for determining the conductivity issues are included entirely within the wire harness to reduce installation space and maintain protection of the devices.

As referred to herein, a "megaohmmeter" can refer to any type of ohmmeter or other measuring device used to measure the electrical resistance of insulators (e.g., cable jackets, wire sheaths, etc.). In some embodiments, these insulators may need be tested for their insulation strength at the time of commissioning and as part of maintenance of high voltage electrical equipment and installations. In other embodiments, such as some of those described herein, the insulators may need to be monitored to detect conductive issues within the insulation of electrical wires on a vehicle, which can be indicative of a fault (e.g., a rodent chewing through the wire harness, etc.). Wire harness, wire sheath, wire loom, wire insulation, and wire jackets may be used interchangeably herein, and can refer to any type of covering surrounding one or more wires partially or entirely.

In general, the term "protective layers" is used to refer to the several different insulation layers that surround (either partially or entirely) the one or more wires described herein. This may include the wire harness surround a collection of wires, the rubber insulation that typically surrounds individual wires, a plastic sheet within the insulation for an individual wire, or any combination thereof. In some embodiments, the individual layers surrounding each wire as insulation are generally referred to as "layers" herein.

Overall Vehicle

Figure 1:
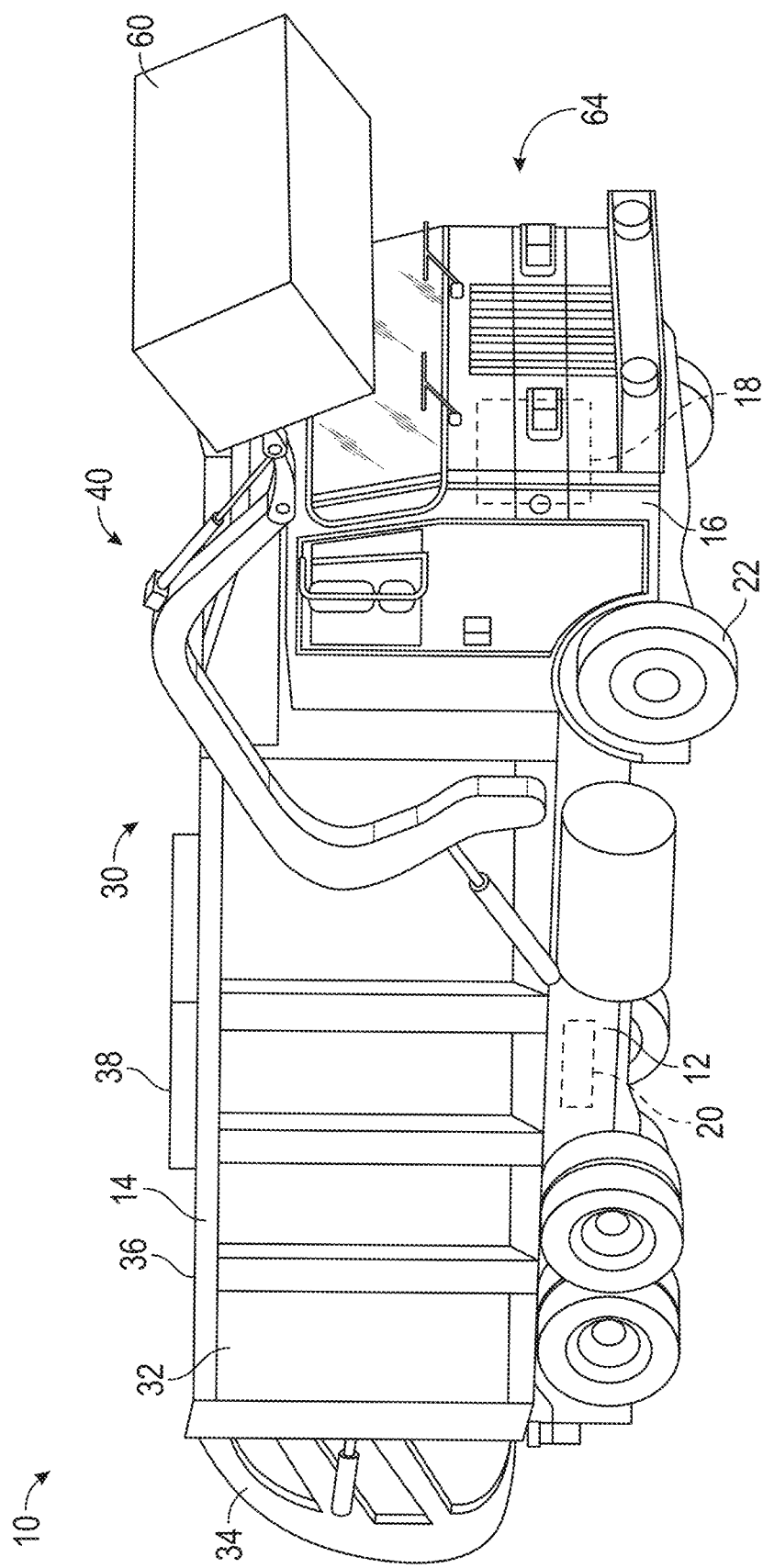
FIG. 1 is a perspective view of an electric refuse vehicle, according to an exemplary embodiment.

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60.

The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

The tailgate 34 may be configured to transition between a first position, a closed position, a sealed position, etc., (e.g., a first state or first position as shown in FIG. 1) and a second position, an open position, an open position, an open state, an open configuration, etc. (e.g., as shown in FIG. 4C). The tailgate 34 can be operated to transition between the first position and the second position using any of multiple driving mechanisms, assembles, apparatuses, etc., as described herein. In some embodiments, the driving mechanisms for transitioning the tailgate 34 between the first position and the second position are fully electric systems (e.g., including various linear electric actuators, electric motors, gearing assemblies, etc.). In other embodiments, the driving mechanisms for transitioning the tailgate 34 between the first position and the second position are hybrid systems including one or more primary electric movers (e.g., linear electric actuators, electric motors), and other motive systems that operate based on a different principle (e.g., a different source of energy, such as hydraulic, pneumatic, mechanical, etc.). In some embodiments, the tailgate 34 is transitionable between the first position and the second position by pivoting relative to refuse compartment 30. When the tailgate 34 is in the first position, the refuse compartment 30 may be accessed, while when the tailgate 34 is in the second position, access to the refuse compartment 30 may be restricted, prevented, or limited. For example, the tailgate 34 can be hingedly coupled at a top portion, a bottom portion, a right portion, a left portion, etc., of refuse compartment 30 and may pivot or rotate relative to the hinged coupling to facilitate selective access to refuse compartment 30. In some embodiments, the tailgate 34 is transitionable between the first position and the second position in response to a user input (e.g., a user request) that is provided by an operator via a human machine interface (HMI) on refuse vehicle 10.

Electrical Subsystem

Figure 2:
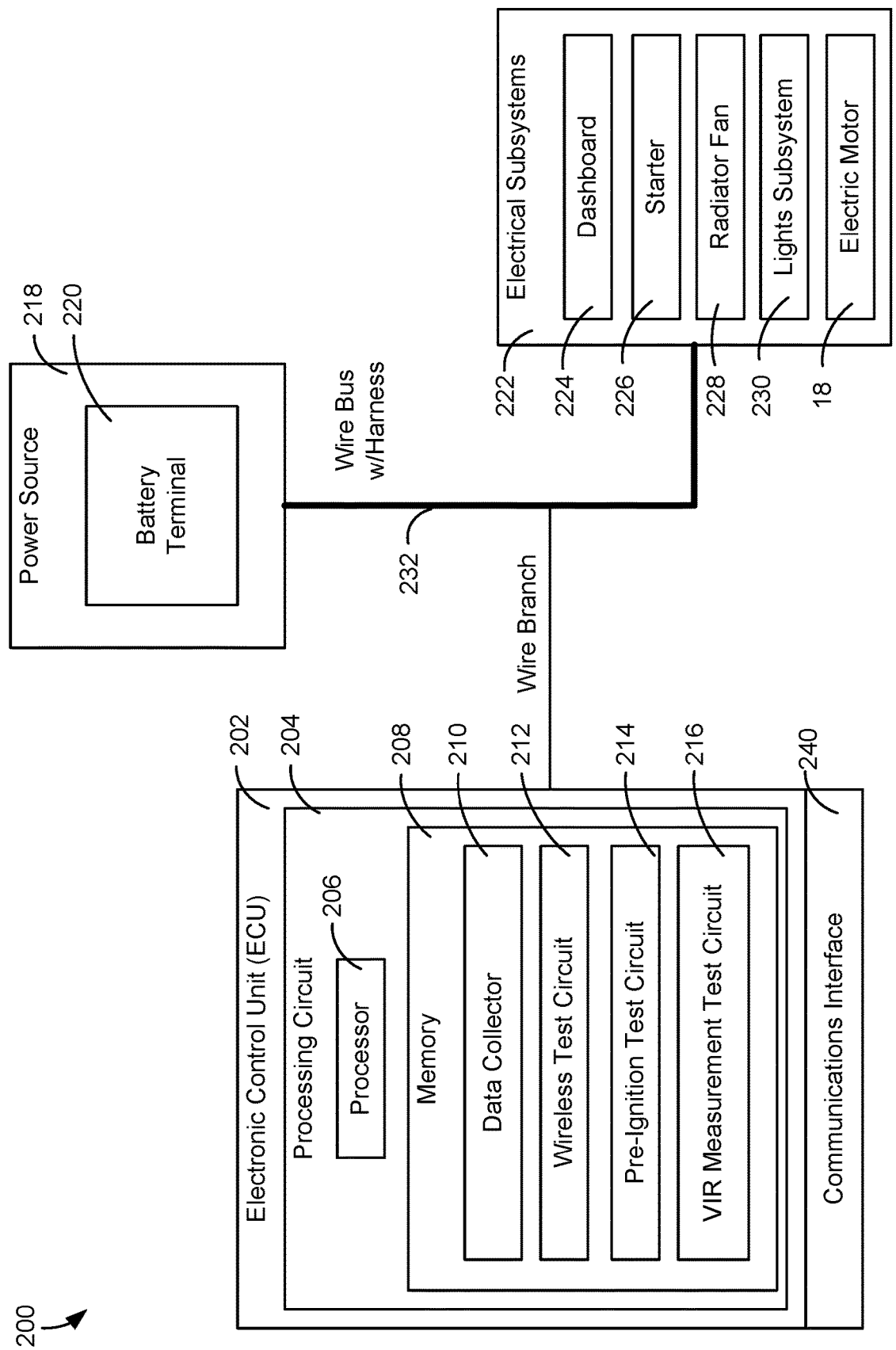
FIG. 2 is a block diagram of a vehicle electrical system, which can be implemented within the vehicle of FIG. 1, according to an exemplary embodiment.

Referring now to FIG. 2 a vehicle electrical system ("system") 200 is shown, according to some embodiments. In some embodiments, system 200 is configured to provide electrical control from one or more control devices (e.g., electronic control unit 202, etc.) to electrical end devices in the system 200. System 200 is shown to include electronic control unit (ECU) 202, power source 218, electrical subsystems 222. In some embodiments, power source 218 is electrically connected to electrical subsystems 222 via a wire bus or wire harness. The wire harness 232 may include one or more wires and/or cables for transmitting electrical signals. As shown in FIG. 2, the wire harness 232 provides several wires to electrical subsystems 222, with a wire branch (e.g., a single wire, etc.) branching off of the wire harness to provide signals to the ECU 202. The wire harness 232 can include several cables and/or wires. Similarly, any branches (e.g., wire(s) separating from the wire harness 232 to be electrically connected to an end device) can include one or more wires or cables.

In some embodiments, ECU 202 is configured to monitor and control some or all of the electrical subsystems 222 within vehicle 10. In some embodiments, this includes monitoring short-circuit faults or open-circuit faults. For example, ECU 202 determines that there is an open-circuit fault, due to one of the wires within wire harness 232 being severed at a point within the wire harness 232. ECU 202 includes processing circuit 204 including processor 206 and memory 208 and communications interface 240. Processing circuit 204 can be communicably connected to communications interface 240 such that processing circuit 204 and the various components thereof can send and receive data via communications interface 240. Processor 206 can be implemented as a general purpose processor, an application specific integrated circuit (ASIC), one or more field programmable gate arrays (FPGAs), a group of processing components, or other suitable electronic processing components.

In some embodiments, ECU 202 includes artificial intelligence functionality, such as implemented machine learning algorithms and/or neural networks. In one embodiment, ECU 202 learns from the detected conductivity faults and/or solutions implemented to resolve the detected conductivity faults, allowing ECU 202 to predict a potential solution for conductivity issue. In another embodiment, ECU 202 learns and adjusts subsystems within vehicle 10 (e.g., hydraulic pressures, battery output, etc.) to compensate for vehicle degradation.

The memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 208 can be or include volatile memory or non-volatile memory. Memory 208 can include database components, object code components, script components, or any other type of information structure for supporting the various activities and information structures described in the present application. According to an example embodiment, memory 208 is communicably connected to processor 206 via processing circuit 204 and includes computer code for executing (e.g., by the processing circuit 204 and/or the processor 206) one or more processes described herein. In some embodiments, the ECU 202 is implemented within a single computer (e.g., one server, one housing, etc.). In various other embodiments the ECU 202 can be distributed across multiple servers or computers (e.g., that can exist in distributed locations).

In some embodiments, the communications interface 240 facilitates communications between ECU 202 and external applications (e.g., the electrical subsystems 222, mobile devices, vehicle-based tablets, etc.) for allowing user control, monitoring, and adjustment to vehicle 10. Communications interface 240 can be or include wired or wireless communications interfaces (e.g., jacks, antennas, transmitters, receivers, transceivers, wire terminals, etc.) for conducting data communications within vehicle 10. In various embodiments, communications via communications interface 240 can be direct (e.g., local wired or wireless communications) or via a communications network (e.g., a WAN, the Internet, a cellular network, etc.). Memory 208 includes data collector 210, wireless test circuit 212, pre-ignition test circuit 214, and voltage, current, and resistance (VIR) measurement circuit 216.

The data collector 208 may be configured to collect test signal data and current, voltage, power, resistance, and conductance data. In some embodiments, data collector 208 provided during testing via the wireless test circuit 212, the pre-ignition test circuit 214, the VIR measurement test circuit 216, or any combination thereof. The wireless test circuit 212, the pre-ignition test circuit 214, and the VIR measurement test circuit 216 are described in greater detail below with reference to FIGS. 4-7.

The power source 218 may be configured to provide electric current to the electric motor of the vehicle 10, and other devices within the vehicle 10 including the electrical subsystems 222. In some embodiments, the power source 218 includes the battery terminal 220. In one embodiment, the battery terminal 220 is a typical 12V rechargeable battery. In some embodiments, the battery terminal 220 provides power to electric motor 18 as described above. The electrical subsystems 222 includes dashboard 224, starter 226, radiator fan 228, lights subsystem 230, electric motor 18. In some embodiments, the electrical systems 222 can be or include any collection of devices that require electrical power to operate. In one embodiment, power source 218 provides the operating voltage (e.g., 12V, 90V, etc.) to the electric motor 18 via wire harness 232.

In some embodiments, vehicle 10 is vocational vehicle (e.g., a refuse vehicle, etc.). In some embodiments, vehicle 10 is another type of vehicle (e.g., electric vocational vehicle, electric concrete mixer, gas vehicle, garbage truck, etc.). As described herein, a vocational vehicle can be any type of truck used for transporting or performing an intended function, including dump trucks, garbage trucks, concrete mixers, various configurations thereof (e.g., IC engines, electric, hybrid, etc.). While the systems and methods described herein generally refer to systems and methods for electrical vehicles, they may similarly be considered for gasoline, diesel, and hybrid vehicles.

Wire Harness Configurations

Figure 3A:
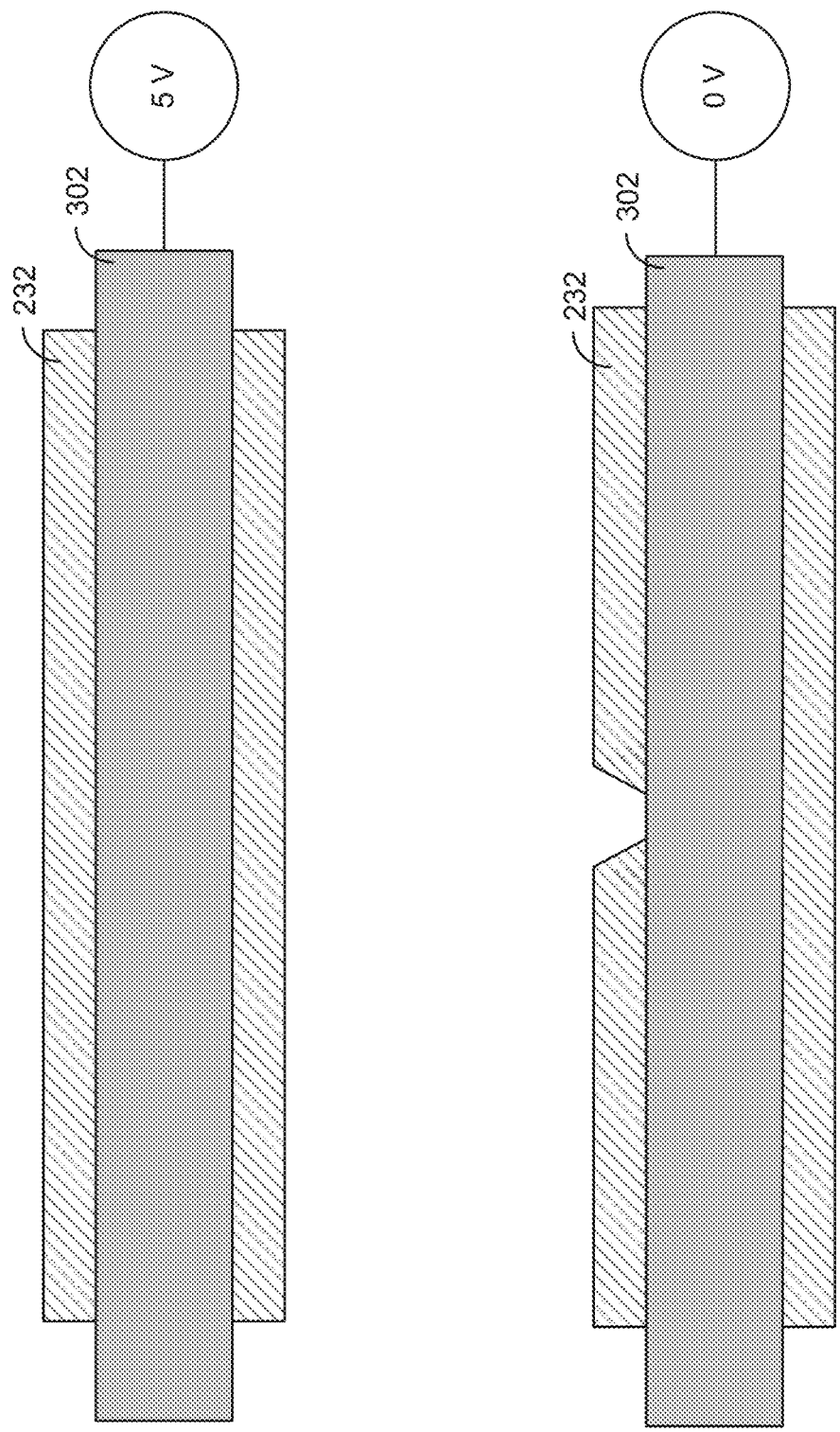
FIG. 3A is a diagram of wire harness including a wire experiencing a conductivity fault, which can occur within the electrical system of FIG. 2, according to an exemplary embodiment.

Referring now to FIG. 3A a diagram with different embodiments of wire 302 protected via harness cover 302 is shown, according to some embodiments. In one embodiment, wire 302 is included within the wire harness 232. As described herein, wire 302 may refer to any wire within wire harness 232, however in a general embodiment may be or include the wiring provided to electric motor 18 for operating vehicle 10.

FIG. 3A shows the wire harness 232 experiencing a fault. In some embodiments, a fault, as described herein, refers to one or more wires losing some or all conductance based on an external factor affecting the circuit. For example, vehicle 10 experiences a rodent (e.g., a rat) attempting to chew through the wire harness 232. Successfully, the rat eats through the harness layer and chews through wire 302, thus breaking the electrical connection made by wire 302. In some embodiments, the wire harness 232 is made with a deterrent material to help prevent the rodents from seeking out and/or chewing through the wire harness 232.

In another example, vehicle 10 is a concrete mixing truck (e.g., front-load concrete mixer, end-load concrete mixer, etc.), wherein excess cementitious material lands on the outside of the wire harness 232 and leads to degradation. Eventually, the wire harness 232 degrades to such an extent that the cementitious material eats through the wire harness 232 and affects the conductance of the wire 302 (e.g., breaks through the wire 302). This is shown as an exemplary embodiment in the bottom portion of FIG. 3A.

Figure 3B:
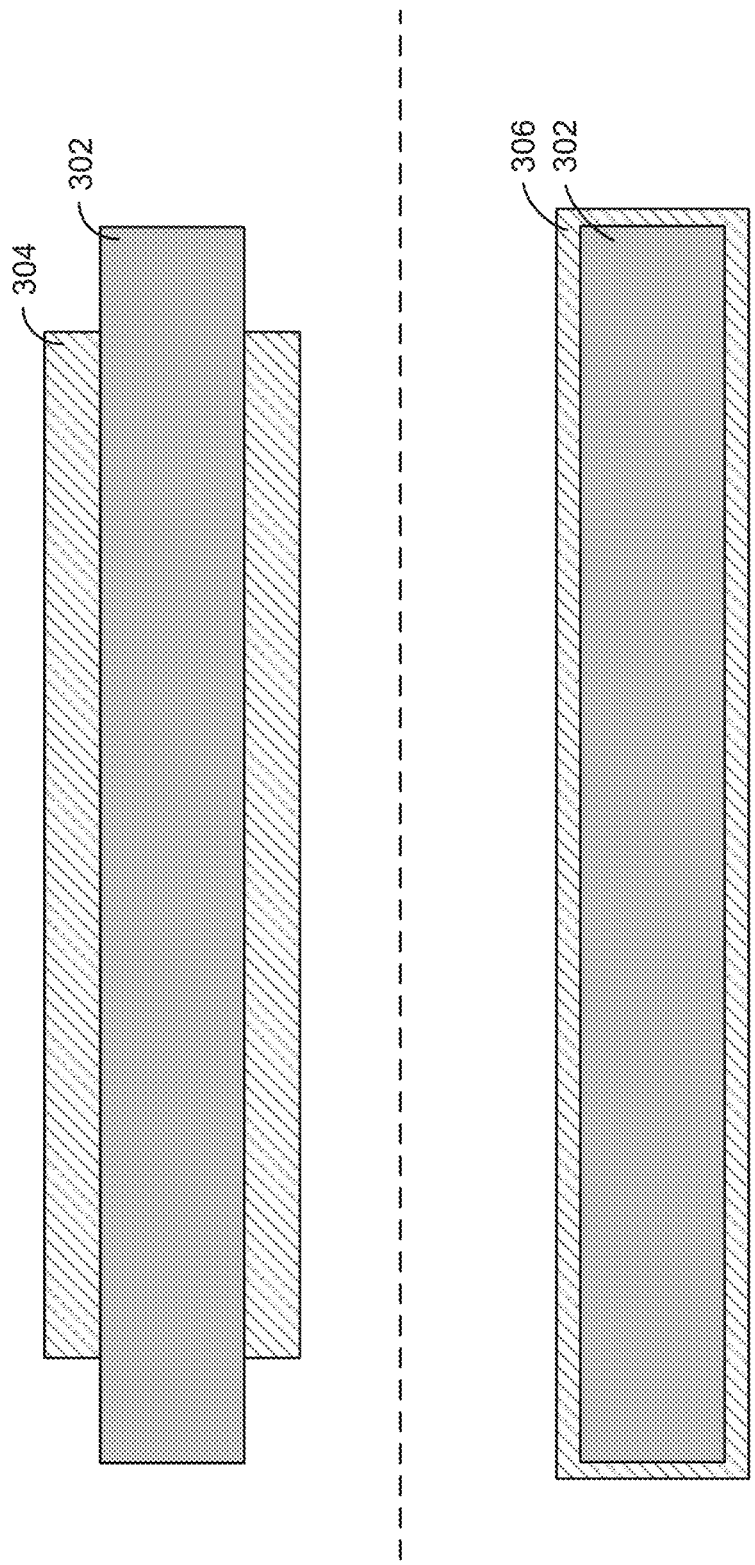
FIG. 3B is a diagram of wire harness configurations, which can be included within the electrical system of FIG. 2, according to an exemplary embodiment.

Referring now to FIG. 3B, several different configurations of the wire harness 232 and the wire 302 are shown, according to some embodiments. As shown in the top portion of FIG. 3B, the wire harness 232 includes a protective sleeve 304. The protective sleeve 304 can be included within the wire harness 232. In one embodiment, the protective sleeve 304 is a rodent protective sleeve that includes one or more wires configured to determine functionality of the wire 302. In some embodiments, the wire harness 232 and the protective sleeve are independent of each other. In some embodiments, the wire 302 is covered by the protective sleeve 304, which is covered by the wire harness 232.

As shown in the bottom portion of FIG. 3B, the wire 302 is shown to be covered by a wire jacket 306. In some embodiments, the wire jacket 306 is part of the wire harness 232. In other embodiments, the wire jacket 306 and the wire harness 232 are independent of each other. The wire jacket 306 may similarly include one or more wires configured to determine functionality of the wire 302. In some embodiments, the wire harness 232 may include the wire 302 and one or more wires for determining whether wire 302 is operating correctly. In some embodiments, the wire harness 232 includes embedded sensor wire (e.g., wires configured to sense conductance/resistance on the wire 302) and the embedded sensor wire is tested upon startup of vehicle 10. In one embodiment, this is described in greater detail below with reference to FIG. 4.

In one non-limiting example, a rodent may chew through wire jacket 232 (e.g., or jacket 304 or jacket 306, etc.) to expose the wire 302. Consequently, a short may occur (e.g., via contact with the rodent, exposure to liquid, etc.) indicated by the "0V" reading in FIG. 3A. As described below wire 302 is monitored using a resistance (and/or a conductance) meter to determine whether these types of situations are occurring, and whether a short or open wire situation has occurred. Following the above example, the rodent may completely chew through the wire, whereby the ohm meter can determine an open circuit has occurred following a resistance measurement of the wire after the rodent has completely chewed through it. Theoretically, this would provide an infinitely high resistance to the ohm meter, but more practically will provide a significantly high resistance (e.g., 10 megaohms, etc.).

Fault Detection Configurations

Fault Detection Via Resistance/Conductance Monitoring

Figure 4:
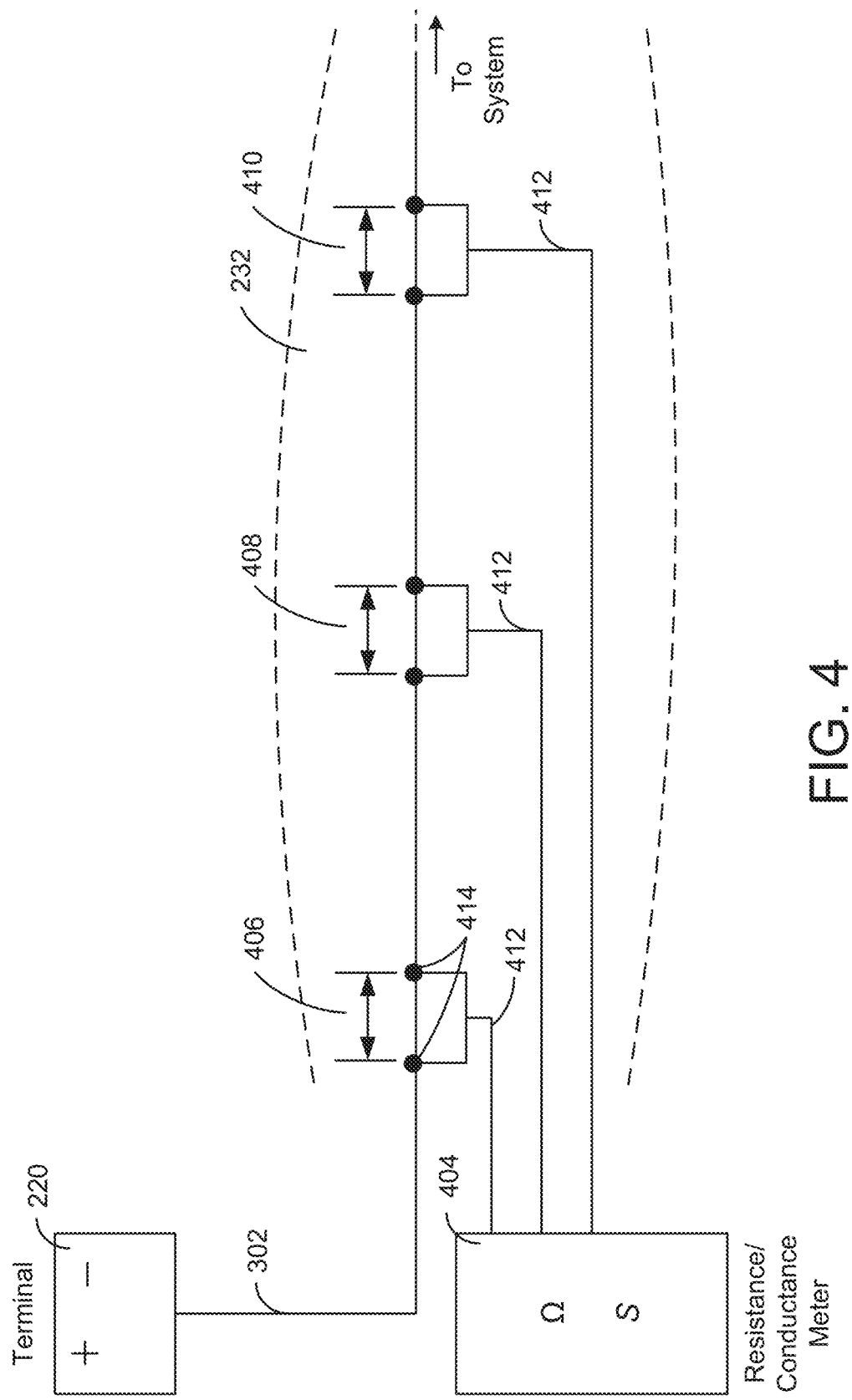
FIG. 4 is a diagram of a fault detection system using resistance/conductance monitoring, which can be performed by the electrical system of FIG. 2, according to an exemplary embodiment.

As shown in FIG. 4, a system 400 is structured to determine the resistance or capacitance of the wire 302 at one or more locations to determine whether an electrical fault has occurred. In one embodiment, fault determinations and other system data is provided to VIR measurement test circuit 216 for further analytics. System 400 includes terminal 220 and ohm (Ω) meter 404. Ohm meter 404 can be or include any time of resistance or conductance meter that is typically used to measure resistance/conductance on a wire. While FIG. 4 shows a separate meter (ohm meter 404) taking measurements at sections 406-410, this is merely meant to be exemplary and should not be considered limiting. In another example, the ohm meter 404 is part of ECU 202 and the ECU 202 directly receives the test wires 412 that are located within the wire harness 232. In another embodiment, the ohm meter 404 is simply a resistance sensor configured to measure resistance/conductance at sections 406-410 and provide the data to ECU 202 for analytics. While FIG. 4 shows ohm meter 404 measuring multiple sections 406-410 on wire 302, ohm meter 404 may simply measure to the wire 302 directly at the terminal 220 and at the end point prior to connecting to the end device in the subsystem intended (e.g., the starter, the motor, etc.), such that the entirety of the wire 302 is measured to determine whether there is a fault within the wire 302.

Conversely, multiple test wires 412 can be used (as shown) to pinpoint the location of the fault. For example, ohm meter 404 measures section 406, 408, and 410, and receives measurements that read 0Ω, 3Ω, and 25 GΩ, respectively. Ohm meter 404 provides this data to ECU 202. ECU 202 determines that section 410's resistance measurement of 25 GΩ is indicative of a lapse in conductivity, which might include a broken wire within section 410. Corrective action may be subsequently implemented via ECU 202, a notification may be provided to the operator regarding the fault, or a combination of both may be implemented.

In one embodiment, ohm meter 404 measures the resistance of the wire 302 to determine one of more faults within the wire 302. For example, prior to starting vehicle 10, the operator of the vehicle wishes to test to see if the wire 302 is working properly. The operator engages ohm meter 404 to test sections 406-410 to determine whether there are any lapses of conductivity (e.g., a broken wire between the two contact points 414, etc.). The ohm meter 404 determines that there is an infinite amount of resistance between contact points 414, indicating that there is a significant lack of conductance within section 406 of the wire 302, which is considered a fault. Ohm meter 404 provides a signal to ECU 202 indicating the fault.

Fault Detection Via Wireless Transmission

Figure 5:
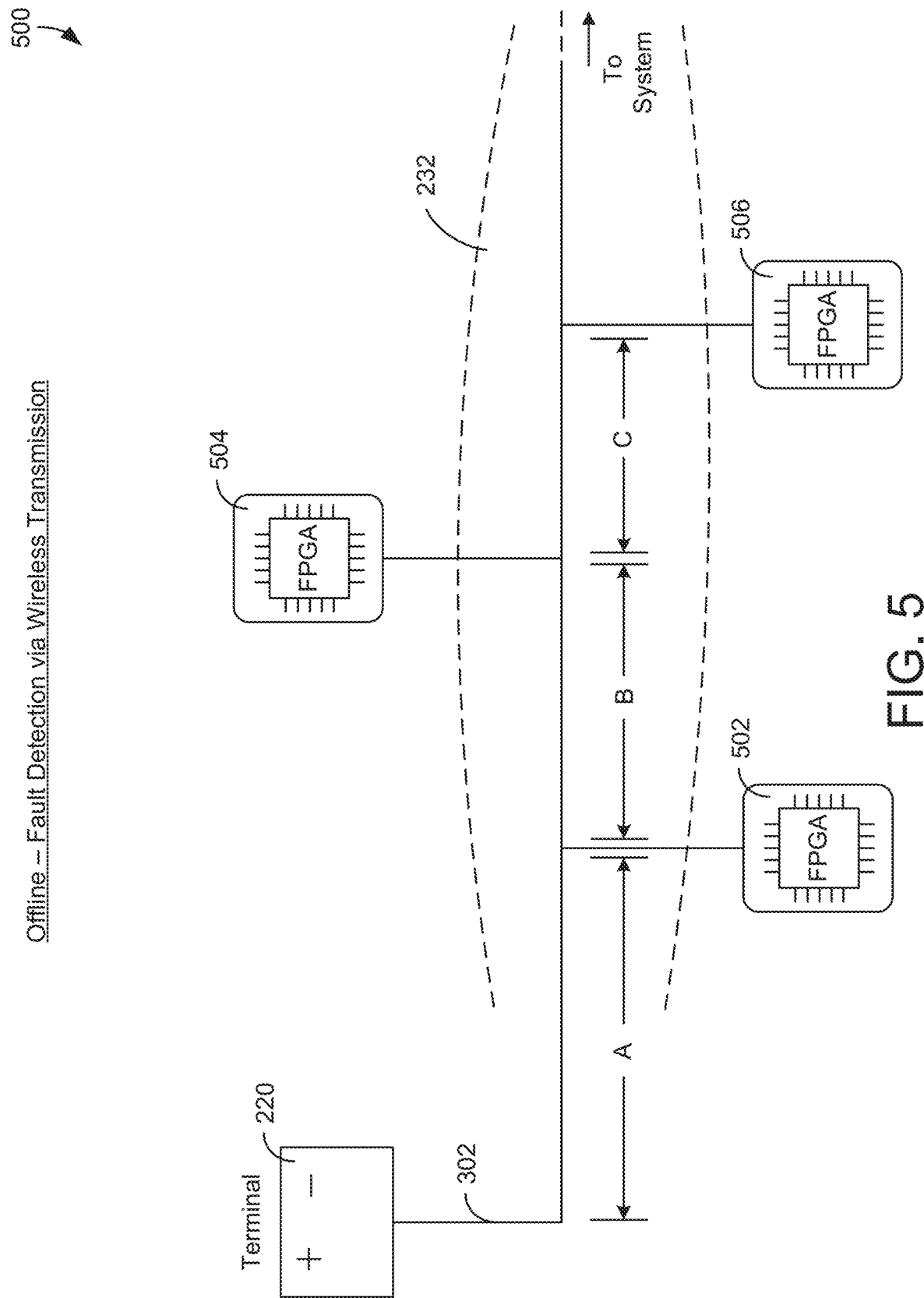
FIG. 5 is a diagram of a fault detection system using wireless signal transmission, which can be performed by the electrical system of FIG. 2, according to an exemplary embodiment.

Referring now to FIG. 5, a system 500 to detect connectivity faults in the wire 302 is shown, according to some embodiments. System 500 may be or include a different embodiment for detecting connectivity faults than system 400 within vehicle 10. System 500 includes terminal 220, the wire 302, and field programmable gate arrays (FPGAs) 502-506. System 500 uses wireless transmission signals between FPGAs 502-504 to determine faults within the wire 302. In some embodiments, system 500 is performed partially or entirely by wireless test circuit 212. For example, FPGA's 502-506 are included within ECU 202 to perform the functions of system 500 described herein.

In an exemplary embodiment, FPGA 502 is powered by a branch wire off of the wire 302. Accordingly, if FPGA 502 does not have power after the test has been initiated, system 500 may determine that there is a connectivity fault within section A. In another embodiment, FPGA 502 is powered by a branch wire off of the wire 302 with no conductivity issues. The FPGA 502 provides a test signal to FPGA 504 such that section B may be analyzed for connectivity issues. The test signal may be sent wiredly (e.g., across section B) or wirelessly, in the event that FPGA 502 is independently powered and the system 500 is offline. In such an embodiment, the signal sent from FPGA 502 may, in turn, power FPGA 504 such that FPGA 504 can provide a test signal to FPGA 506 to determine the conductivity of section C. This process can be daisy-chained throughout multiple FPGA's within system 500.

In some embodiments, the FPGA's 502-506 are independently powered outside of the wire harness 232 and connect to the wire 302 via branches off of the wire 302 (as shown). In other embodiments, the FPGA's 502-506 are not connected wiredly to the wire 302 and provide one or more test signals to a transceiver (not shown) on the wire 302 that can receive the test signal and provide an status of the test back to one of the FPGAs. The FPGAs, as described herein, may be similar or identical to ECU 202. In some embodiments, one or more FPGAs can be included in the wire harness 232 such that all testing of the wire 302 is performed within the wire harness 232. In various embodiments, all of the systems described herein for detecting faults in the wire 302 may be performed partially or entirely within the wire harness 232 (e.g., including processing devices, sensors, wires, meters, etc.).

Fault Detection Via Pre-Ignition Test Signal

Figure 6:
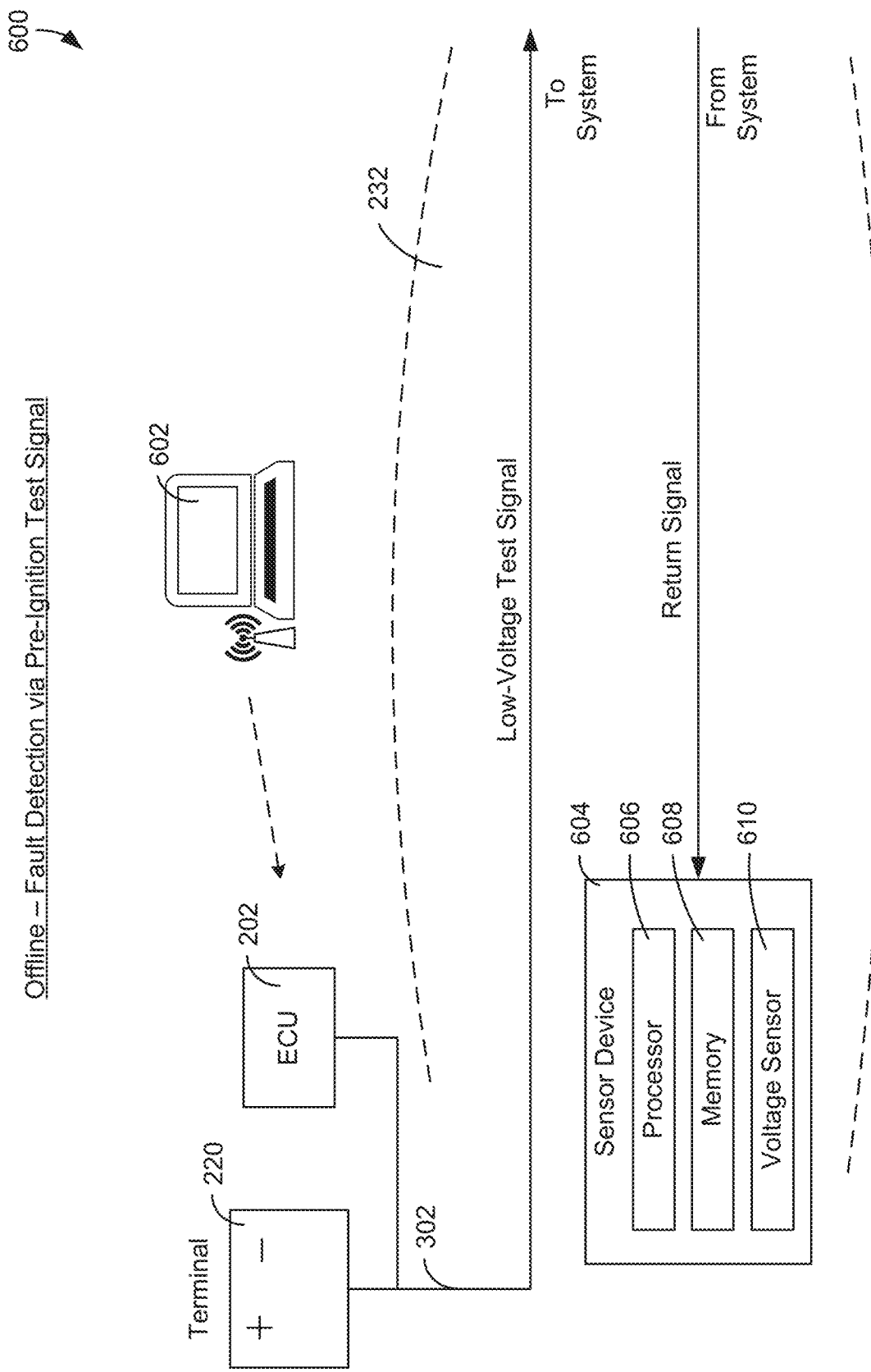
FIG. 6 is a diagram of a fault detection system using a pre-ignition test signal, which can be performed by the electrical system of FIG. 2, according to an exemplary embodiment.

As shown in FIG. 6, a system 600 is structured to determine conductivity issues within the wire 302 by supplying a test signal across the wire 302 to a sensor device 604 inside of the wire harness 232. System 600 includes terminal 220, the wire 302, the wire harness 232, the sensor device 604, and user device 602. The systems and methods described herein with reference to FIG. 6 may be performed by pre-ignition test circuit 214 stored within the ECU 202.

Sensor device 604 may be configured to monitor the voltage level in the signal provided by ECU 202 and determine if there is a conductivity error with the wire 302 based on the received voltage level. In one embodiment, sensor device 604 includes a processor 606, a memory 608, and a voltage sensor 610. In some embodiments, sensor device 604 is housed entirely within wire harness 232, such that sensing of the conductivity of the wire 302 can be performed via an embedded sensor system within the wire harness 232.

User device 602 may be any time of wired or wireless device communicably connected to system 600. In some embodiments, user device 602 is a laptop, mobile device (e.g., a smartphone), tablet, or vehicle-specific end device (e.g., a wireless tablet specifically configured to connect with the ECU 202, etc.). In one embodiment, user device 602 provides the signal to engage the pre-ignition test to begin the test, which is performed prior to initial start-up of the vehicle 10.

In one embodiment, ECU 202 receives instructions from user device 602 to begin the low-voltage test signal to determine the conductivity of the wire 302. ECU 202 sends a low-voltage test signal to sensor device 604 to determine the voltage level. Sensor device 604 receives no signal from ECU 202, indicating that there is a conductivity issue within the wire 302. In some embodiments, multiple sensor devices 604 are included within wire harness 232 to facilitate a section-based voltage issue. For example, multiple sensor devices 604 are connected to the wire 302 via branches off of the wire 302. Based on which sensor devices 604 receive a voltage signal, it can generally be determined the point on the wire 302 in which the conductivity issue occurred.

Fault Detection Via Current Measurement Feedback

Figure 7:
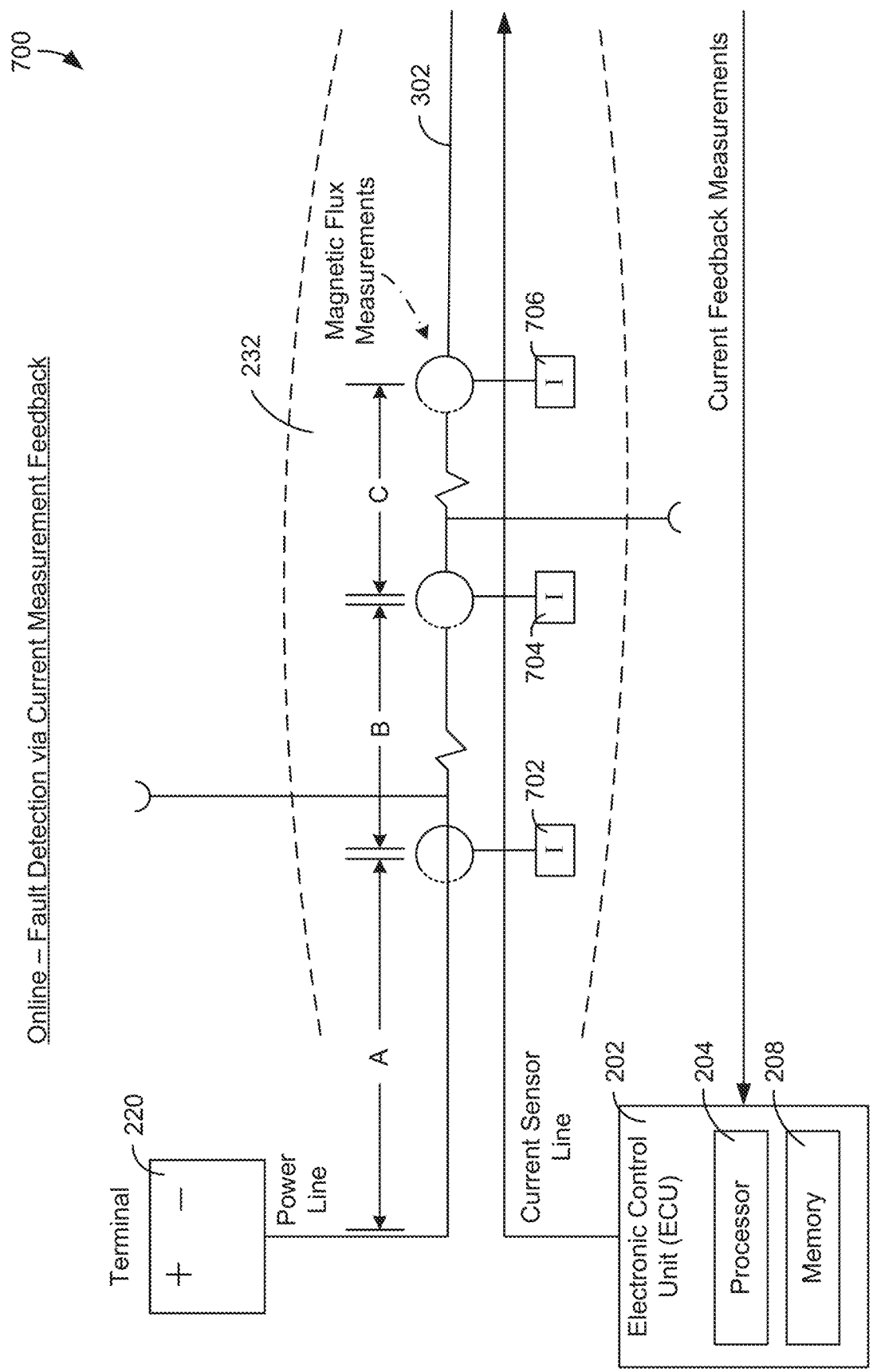
FIG. 7 is a diagram of a fault detection system using current measurement feedback, which can be performed by the electrical system of FIG. 2, according to an exemplary embodiment.

Referring now to FIG. 7, a system 700 configured to determine one or more conductivity issues within the wire 302 based on a measurement reading of various locations on the wire 302, via one or more current sensors is shown, according to some embodiments. System 700 includes terminal 220, the wire 302 (indicated as a power line), the wire harness 232, the ECU 202 including the processor 204 and the memory 208, and current sensors 702-704.

In an exemplary embodiment, ECU 202 is configured to receive current measurements from current sensors 702-704 at different locations within wire harness 232. Terminal 220 powers the wire 302 providing voltage to electric motor 18. The current sensor 702 may measure the current at section A to determine if there is a readable measurement for current. If there is, ECU 202 may determine that there is no conductivity issues within section A. This process can be continued between the various sections of the wire 302. In some embodiments, power line branches stem from the wire 302 to provide power to the electrical subsystems 222. Accordingly, multiple current sensors (e.g., current sensors 704, 706, etc.) may be used to determine the different current readings within the wire 302.

Conductivity Detection Processes

Figure 8:
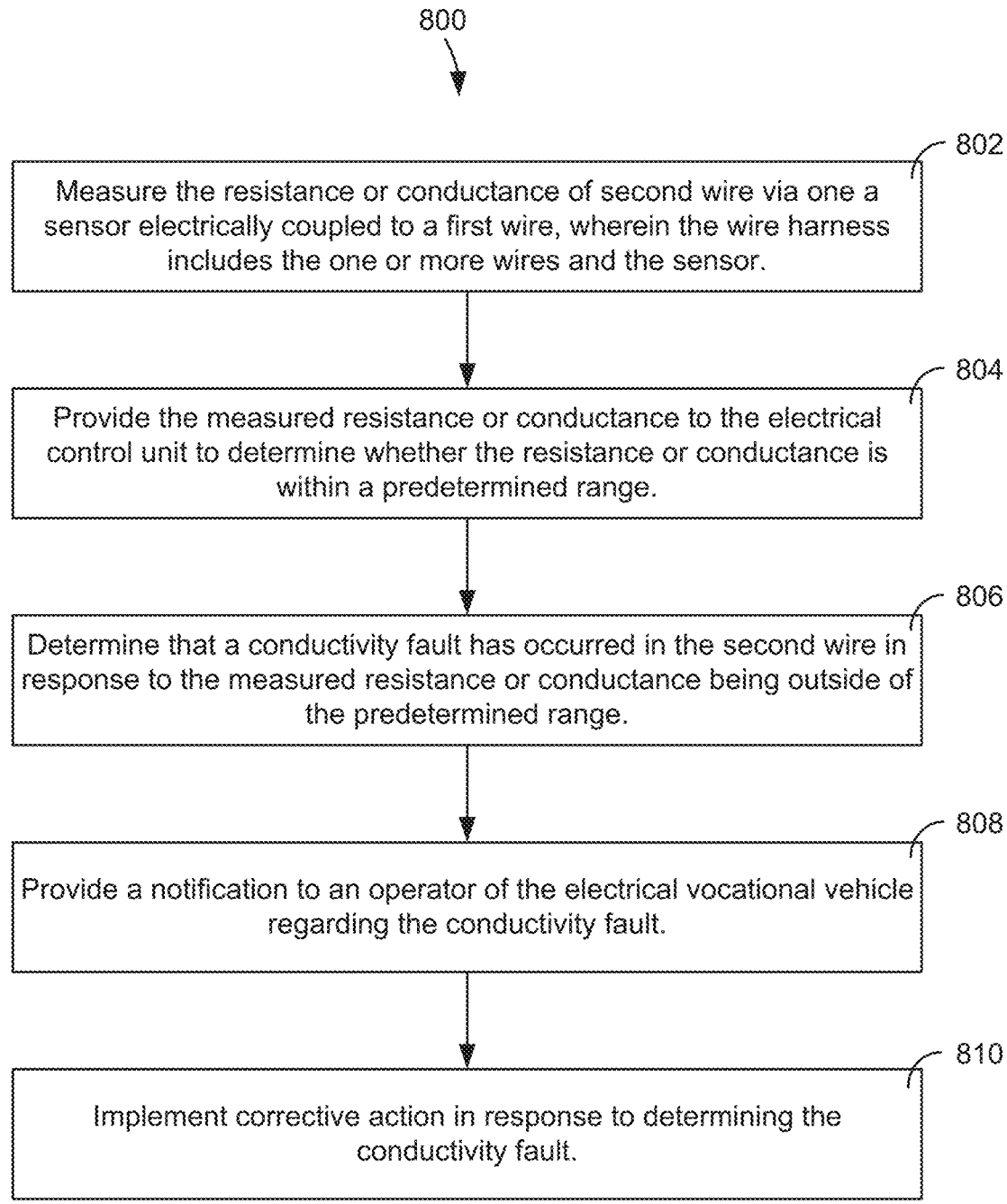
FIG. 8 is a flow diagram of a process for detecting conductivity issues in a wire within a wire harness, which can be performed by the electrical control unit of FIG. 2, according to an exemplary embodiment.

As shown in FIG. 8, a flow diagram process 800 to detect conductivity issues within one or more wires included in a wire harness is shown, according to some embodiments. In one embodiment, process 800 is implemented via ECU 202. Process 800 may be configured to detective conductivity issues within wire 302 via one or more sensors also located within wire harness 232.

At step 802, process 800 measures the resistance or conductance of second wire via one a sensor electrically coupled to a first wire, wherein the wire harness includes the one or more wires and the sensor. At step 804, process 800 provides the measured resistance or conductance to the electrical control unit to determine whether the resistance or conductance is within a predetermined range. At step 806, process 800 determines that a conductivity fault has occurred in the second wire in response to the measured resistance or conductance being outside of the predetermined range.

In one embodiment, ohm meter 404 measures the sections 406-410 on the wire 302 and provides the resistance/conductance measurements to ECU 202 for analytics. ECU 202 may include a predetermined threshold that indicates whether the resistance or conductance is indicative of a conductivity fault. For example, if ECU 202 receives a resistance measurement of 5GΩ, this can be indicative of the wire being broken at the measured location (e.g., indicative of a conductivity fault).

At step 808, process 800 provides a notification to an operator of the electrical vocational vehicle regarding the conductivity fault. This may be performed by the communications interface 240 when ECU 202 determines a fault. In one embodiment, the fault indication is provided to an operator-based tablet, so that the operator of vehicle 10 is aware of the conductivity fault prior to the start-up of vehicle 10. In another embodiment, the fault indication is provided to a supervising computer (e.g., workstation for a logistics worker of a fleet of the vehicles 10, etc.) so that appropriate action may be taken to resolve the fault.

At step 810, process 800 implements corrective action in response to determining the conductivity fault. In some embodiments, the ECU 202 includes functionality to automatically correct the conductivity issue or work around the conductivity issue. For example, if wire 302 is configured to route power from power source 218 to the electrical subsystems 222, ECU 202, upon determining that there is a conductivity issue within wire 302, may route power to electrical subsystems 222 via a backup wire or bus.

Megaohmeter System

Figure 9:
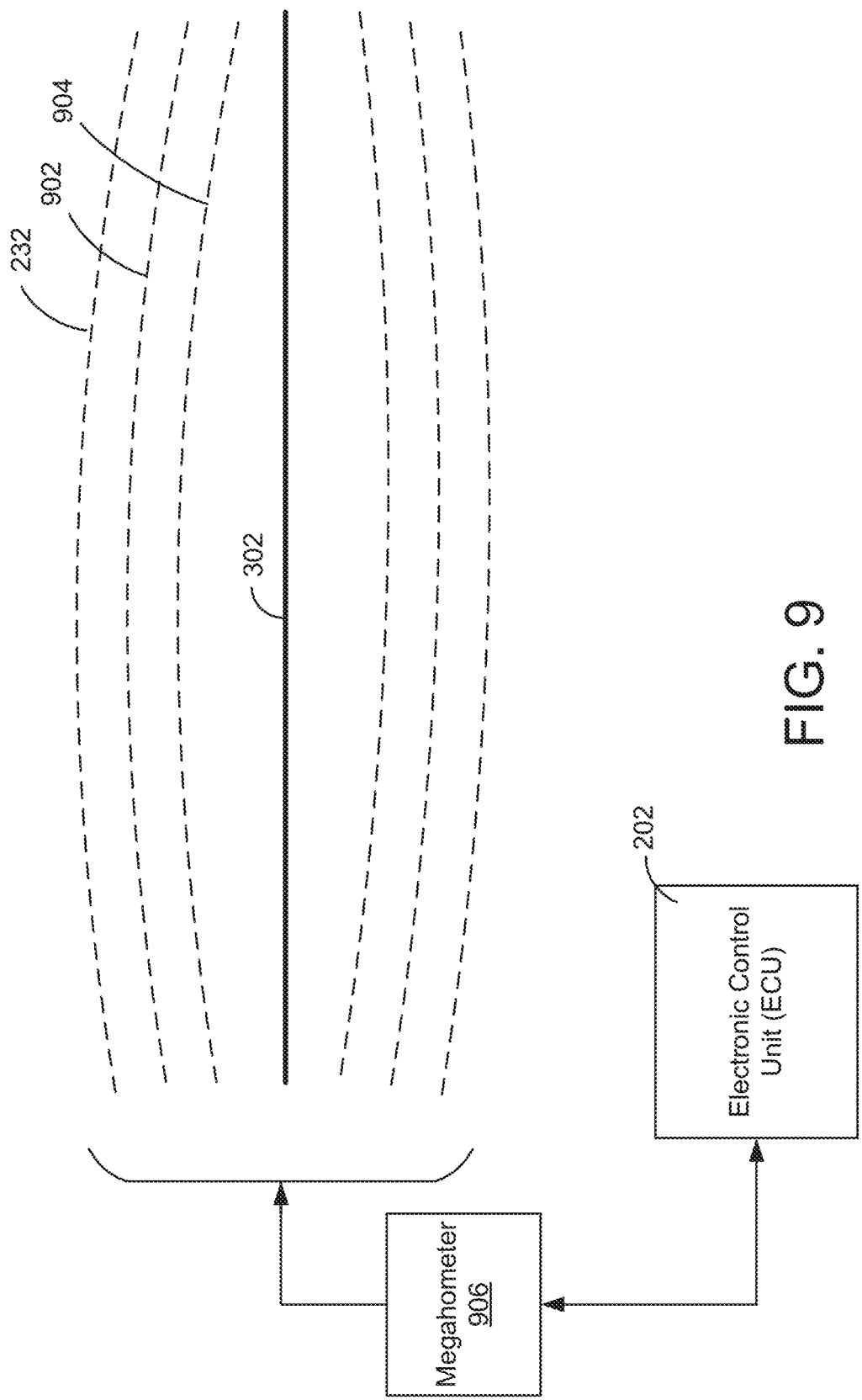
FIG. 9 is a diagram of a system for monitoring resistance/conductance of insulation layers surrounding a wire, which can be performed by the electrical control unit of FIG. 2, according to an exemplary embodiment.

Referring now to FIG. 9, a diagram showing resistance monitoring of insulation around wire 302 using a megaohmmeter is shown, according to some embodiments. While the systems and methods disclosed herein generally refer to monitoring of conductance and/or resistance of wires, similar methods can be applied to the monitoring of the conductance/resistance of the wire sheath, wire loom, and/or wire jacket surrounding wire 302 (e.g., wire harness 232) or any other wires described herein. In some embodiments, a megaohmmeter can be used to measure the resistive properties of wire harness 232 and provide the measurements to ECU 202 for processing.

For example, wire harness 232 includes several layers of protective material, including layer 902 and layer 904. Each layer is actively monitored by megaohmeter 906, with wire harness 232 having a resistance of 1 mΩ, layer 902 having a resistance of 5 mΩ, and layer 3 having a resistance of 10 mΩ. A rodent chews through the insulation of wire harness 232, changing the resistant measured for wire harness 232. This can include the rodent chewing through the entirety (e.g., entirety of the circumference) of wire harness 232 such that the resistance monitoring circuit of wire harness 232 now includes an open-circuit, thus significantly increasing the measured resistance of wire harness 232 (e.g., to 20 mΩ, to a maximum readable value, etc.).

In another example, megaohmeter 906 obtain resistance measurements of wire harness 232 and layer 902 that are significantly higher than expected (e.g., above a predetermined threshold that, when crossed, is indicative of a fault, etc.), while the resistance of layer 904 is within an appropriate range. ECU 202 may determine that a fault has occurred at the top two layers of the covering arrangement of wire 302, but the fault has not affected the lowest layer (i.e., layer 904) or the wire 302 itself. ECU 202 may be configured to provide a notification to an operator (e.g., via communications interface 240, etc.) via a vehicle display, mobile device, vehicle tablet, or other means of communication, indicating that the status and progress of the fault. An operator may then be prompted to address the fault (e.g., a rodent chewing through the wire harness) prior to the fault getting exponentially worse (e.g., the rodent chews through wire 302, etc.). ECU 202 may be configured to monitor both the resistance/conductance of wire 302 and the resistance/conductance of one or more of the protective layers surrounding wire 302 independently or simultaneously.

While not shown in FIG. 9, ECU 202 may include control functionality to provide a fault monitoring, detection, and correction system for any of the wires described herein, such as wire 302. This may generally include monitoring resistance values of protective layers and/or the wire itself, detecting when one or more of the resistance values is abnormal (e.g., above of a predetermined threshold, outside of a predetermined range, etc.), providing a notification indicating the status, intensity, and/or recommended corrective action to an interface (e.g., vehicle tablet for operator, dispatch control, etc.), and/or re-routing power to avoid electrical issues (e.g., after detecting a short circuit, re-routing power to avoid further electrical complications in the sub-system where the short-circuit was detected, etc.).

In some embodiments, the notifications and/or recommended corrective actions can vary based on the progress of the fault. For example, detecting a resistance change in the top-most layer of the protective layers around wire 302 (e.g., wire harness 232) may result in a low-intensity notification (e.g., sending a message to the operator indicating that there is potentially a tear or hole within wire harness 232, etc.), whereas a resistance change in wire 302 may result in a high-intensity notification (e.g., warning alter to the operator, indicating an open-circuit, re-routing of power, etc.).

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fault detection system for a vehicle, the system comprising:
an electrical control unit configured to control one or more electrical systems on the vehicle;
a power source;
a wire harness comprising a plurality of wires, the plurality of wires including (i) a first wire electrically coupled to the electrical control unit and one or more sensors and (ii) a second wire electrically coupled to the power source and at least one of the one or more electrical systems, the second wire is enclosed within a protective covering and wherein the first wire is electrically connected to the second wire at a plurality of pairs of connection points defining a plurality of sections of the second wire within the protective covering;

wherein the electrical control unit is configured to:
obtain a resistance or conductance of each of the plurality of sections of the second wire via the one or more sensors; and
detect a wire conductivity fault in the second wire.

2. The system of claim 1, wherein the electrical control unit is further configured to:
measure the resistance or conductance of the second wire via one of the one or more sensors electrically coupled to the first wire, wherein the wire harness comprises the one or more sensors;
provide the resistance or conductance to the electrical control unit to determine whether the resistance or conductance is within a predetermined range;
determine that the wire conductivity fault has occurred in the second wire in response to the resistance or conductance being outside of the predetermined range; and
provide a notification to an operator of the vehicle indicating the wire conductivity fault.

3. The system of claim 1, wherein the electrical control unit is further configured to:
receive measurements of resistance or conductance of each of the plurality of sections of the second wire;
determine that one of the measurements of resistance or conductance of each of the plurality of sections of the second wire is indicative of the wire conductivity fault; and
provide a notification to an operator of the vehicle regarding the wire conductivity fault.

4. The system of claim 1, wherein the plurality of wires are covered with a protective sleeve independent of the wire harness, the protective sleeve configured to deter rodents from detecting the wire harness, biting the wire harness, or both.

5. The system of claim 1, wherein the plurality of wires are covered with a protective jacket that is integral to the wire harness, the protective jacket configured to deter rodents from detecting the wire harness, biting the wire harness, or both.

6. The system of claim 1, wherein monitoring the resistance or conductance of the second wire via the one or more sensors comprises:
providing a low-voltage test signal to the one or more sensors prior to start-up of the vehicle;
determining the low-voltage test signal is indicative of the wire conductivity fault within the second wire in response to the low-voltage test signal being outside of a predetermined range; and
providing a notification to an operator of the vehicle regarding the wire conductivity fault.

7. The system of claim 1, wherein the protective covering is a sheath, a loom, or a jacket.

8. The system of claim 1, wherein the electrical control unit is further configured to:
monitor, for each of a plurality of insulation layers, a resistance or conductance, the wire harness comprising the plurality of insulation layers; and
detect an insulation layer conductivity fault in each of two or more of the plurality of insulation layers.

9. The system of claim 8, wherein the electrical control unit is further configured to:
provide a first alarm to an operator of the vehicle indicating the insulation layer conductivity fault in each of two or more of the plurality of insulation layers, the first alarm comprising a first intensity; and
in response to detecting both the wire conductivity fault in the second wire and the insulation layer conductivity fault in each of two or more of the plurality of insulation layers, provide a second alarm to the operator of the vehicle, the second alarm comprising a second intensity greater than the first intensity.

10. A fault detection system for a vehicle, the system comprising:
an electrical control unit configured to control one or more electrical systems on the vehicle;
a power source;
a wire harness comprising a plurality of insulation layers and a plurality of wires, the plurality of wires including (i) a first wire electrically coupled to the electrical control unit and one or more sensors and (ii) a second wire electrically coupled to the power source and at least one of the one or more electrical systems, the second wire is enclosed within the plurality of insulation layers;
wherein the electrical control unit is configured to:
obtain a resistance of each of the plurality of insulation layers,
obtain a resistance of the second wire via the one or more sensors; and
detect a wire conductivity fault within the plurality of insulation layers based on the resistance of each of the plurality of insulation layers and the second wire based on the resistance of the second wire.

11. The system of claim 10, wherein the electrical control unit is further configured to:
measure the resistance of the second wire via one of the one or more sensors electrically coupled to the first wire, wherein the wire harness comprises the one or more sensors;
provide the resistance to the electrical control unit to determine whether the resistance is within a predetermined range;
determine that the wire conductivity fault has occurred in the second wire in response to the resistance being outside of the predetermined range; and
provide a notification to an operator of the vehicle indicating the wire conductivity fault.

12. The system of claim 10, wherein the electrical control unit is further configured to:
measure the resistance of the second wire at at least a first location, second location and third location via the one or more sensors electrically coupled to the first wire, wherein the wire harness comprises the one or more sensors;
receive measurements of resistance at the first location, the second location, and the third location;
determine that one of the measurements of resistance at the first location, the second location, and the third location is indicative of the wire conductivity fault; and
provide a notification to an operator of the vehicle regarding the wire conductivity fault.

13. The system of claim 10, wherein the plurality of wires are covered with a protective sleeve independent of the wire harness, the protective sleeve configured to deter rodents from detecting the wire harness, biting the wire harness, or both.

14. The system of claim 10, wherein the plurality of wires are covered with a protective jacket that is integral to the wire harness, the protective jacket configured to deter rodents from detecting the wire harness, biting the wire harness, or both.

15. The system of claim 10, wherein monitoring the resistance of the second wire via the one or more sensors comprises:

providing a low-voltage test signal to the one or more sensors prior to start-up of the vehicle;

determining the low-voltage test signal is indicative of the wire conductivity fault within the second wire in response to the low-voltage test signal being outside of a predetermined range; and providing a notification to an operator of the vehicle regarding the wire conductivity fault.

16. The system of claim 10, wherein the plurality of insulation layers define a protective covering.

17. The system of claim 10, wherein the electrical control unit is further configured to:

provide a first alarm to an operator of the vehicle indicating the insulation layer conductivity fault in each of two or more of the plurality of insulation layers, the first alarm comprising a first intensity; and in response to detecting both the wire conductivity fault in the second wire and the insulation layer conductivity fault in each of two or more of the plurality of insulation layers, provide a second alarm to the operator of the vehicle, the second alarm comprising a second intensity greater than the first intensity.

18. A controller comprising a processing circuit configured to:

monitor connectivity of a wire harness comprising a plurality of wires, the plurality of wires including (i) a first wire electrically coupled to an electrical control unit and one or more sensors and (ii) a second wire electrically coupled to a power source and at least one of one or more electrical systems, the second wire is enclosed within a protective covering, wherein the one or more sensors are electrically wired to the second wire at a plurality of points within the protective covering defining a plurality of sections of the second wire;

obtain a resistance or conductance for each of the plurality of sections of the second wire via the one or more sensors;

detect a wire conductivity fault in the second wire; and provide a notification to an operator of a vehicle indicating the wire conductivity fault.

19. The controller of claim 18, wherein the electrical control unit is further configured to:

measure the resistance or conductance of the second wire via one of the one or more sensors electrically coupled to the first wire, wherein the wire harness comprises the one or more sensors;

provide the resistance or conductance to the electrical control unit to determine whether the resistance or conductance is within a predetermined range; and determine that the wire conductivity fault has occurred in the second wire in response to the resistance or conductance being outside of the predetermined range.

20. The controller of claim 18, wherein the electrical control unit is further configured to:

receive measurements of resistance or conductance for each of the plurality of wire sections;

determine that one of the measurements of resistance or conductance for each of the plurality of wire sections indicative of the wire conductivity fault; and provide a notification to an operator of the vehicle regarding the wire conductivity fault.

* * * * *